G. POLVERINO.
HINGE.
APPLICATION FILED OCT. 6, 1913.
1,084,480.
Patented Jan. 13, 1914.
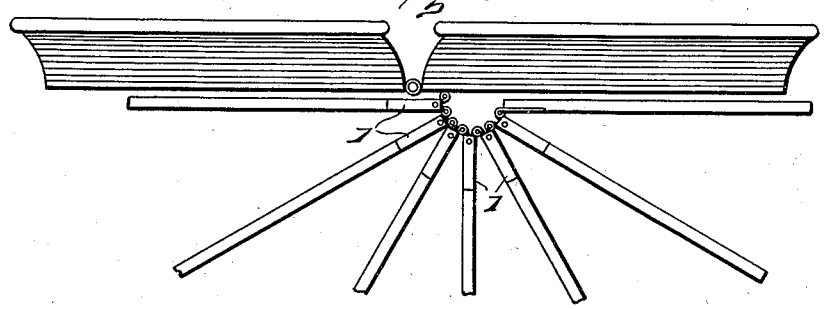
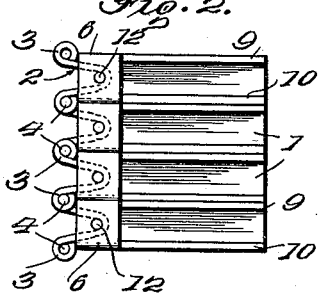
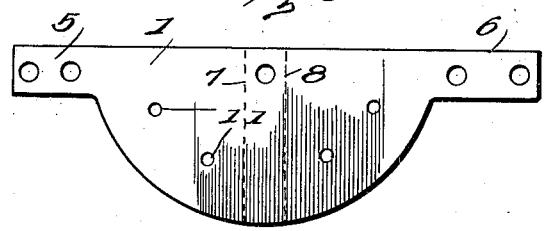
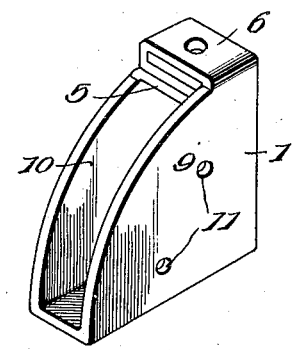
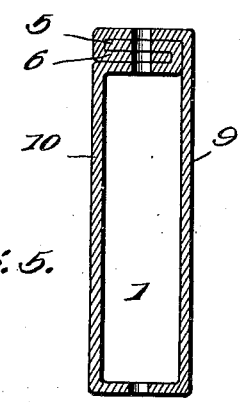
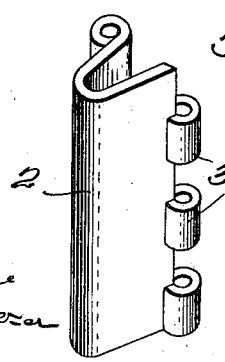
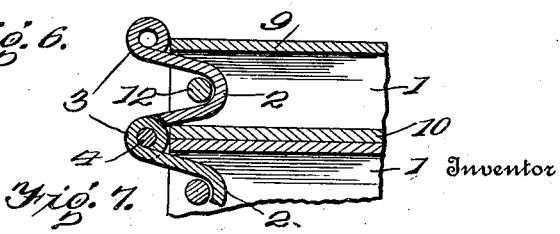
Witnesses
J. R. Pierce
Giuseppe Polverino.
By H. R. Willson & Co.
Attorneys

UNITED STATES PATENT OFFICE.

GIUSEPPE POLVERINO, OF NEW YORK, N. Y.

HINGE.

1,084,480.  Specification of Letters Patent.  Patented Jan. 13, 1914.

Application filed October 6, 1913.  Serial No. 793,716.

*To all whom it may concern:*

Be it known that I, GIUSEPPE POLVERINO, a citizen of the United States, residing at New York, in the county of New York and State of New York, have invented certain new and useful Improvements in Hinges; and I do declare the following to be a full, clear, and exact description of the invention, such as will enable others skilled in the art to which it appertains to make and use the same.

This invention relates to improvements in hinges for connecting the leaves of photograph albums or other books.

The object of the invention is to provide simple and efficient hinges of this character which are connected together and will permit the book leaves to be opened to full extent without danger of breaking.

With this and other objects in view, the invention consists of certain novel features of construction, and the combination and arrangement of parts as will be more fully described and claimed.

In the accompanying drawings: Figure 1 represents a plan or end view of an album in open position, the leaves of which are equipped with these improved hinges; Fig. 2 is a similar view of a plurality of connected hinges shown separate from the book; Fig. 3 is a plan view of the blank from which one of the leaf engaging members is constructed; Fig. 4 is a perspective view of one of these leaf engaging members detached shown made up ready for assembling; Fig. 5 is a vertical detail section thereof; Fig. 6 is a perspective view of one of the elements which connect the leaf engaging elements; Fig. 7 is a horizontal section of the hinge.

In the embodiment illustrated a plurality of leaf receiving and supporting members 1 are shown which are designed to be mounted or connected to opposite ends of the leaves to be united. These members 1 are hingedly connected by elements 2 which are substantially U-shaped in cross section and are of a length corresponding to the height or length of the members 1 and are provided at their side edges with knuckles 3, the knuckles on the edges of one element cooperating with those on the elements on opposite sides and being connected thereto by the usual pintles 4. Each of these leaf engaging members 1 is constructed of the blank shown in Fig. 3 which is semi-circular in shape being provided at its opposite ends flush with the straight edge thereof with tongues 5 and 6 which are designed to be bent to form interlocking hooks when the blank is folded to produce the completed leaf receiving member. This blank is folded transversely intermediately of its ends on the lines 7 and 8 whereby two side plates 9 and 10 are formed laterally spaced from each other a sufficient distance to receive between them on the straight edge thereof one of the connecting hinge elements 2. After being folded on these lines 7 and 8 with the side plates 9 and 10 arranged parallel and spaced equal distances apart throughout their length, the hooks which are formed by the tongues 5 and 6 are engaged as shown in Fig. 5 whereby said side members or plates 9 and 10 are held securely in position against spreading. These side plates may be secured to the leaf to which they are to be attached by any suitable means, apertures 11 being preferably provided for rivets which are passed through these plates and the leaf thereby securely connecting them together. In assembling these leaf receiving members a plurality of the elements 2 are first hingedly connected by engaging the pintles 4 with the knuckles of the adjacent elements and then these elements have their folded body portions inserted between the open straight ends of the plates 9 and 10 and when they are so positioned, pintles 12 are extended through registering apertures in the hooks formed by the tongues 5 and 6 and an oppositely disposed aperture in the closed end member which connects the two plates 9 and 10 whereby said plates are firmly secured to the hinge members 2 and by this connection said members 1 have a slight lateral movement relatively to the hinge elements 2. Any desired number of these leaf engaging members may be so connected according to the number of leaves which are to be united and after the desired number have been so connected, said members 1 are engaged with the inner corners of the book leaves and secured thereto by rivets or other suitable means, one connected series of members 1 being engaged with the upper corners of the leaves and another with the lower corners thereof, the closed ends formed by the portion of the plates between the folds made on the lines 7 and 8 engage the end edges of the book leaves and protect them at this point. After the leaves have been connected by these members as described they may be fastened to the backs of a book in any desired manner.

While these hinges have been described as used in connection with the leaves of a book it will be obvious that they may be employed for connecting other articles such as plates or screens or any other objects which are desired to be hingedly connected.

I claim as my invention:

1. A device for pivotally connecting a plurality of elements comprising element receiving members having laterally spaced side plates connected at their upper and lower ends, a plurality of hingedly connected elements substantially U-shaped in cross section and adapted to fit between the plates of said receiving members, and pintles extending through the opposite connected ends of said receiving members and through said U-shaped elements.

2. A hinge comprising receiving members having openings at their inner ends, members inserted in said open ends, said members being substantially U-shaped in cross section, said U-shaped members being hingedly connected at their adjacent edges.

3. In a hinge, a plurality of members substantially U-shaped in cross section and provided along their side edges with knuckles, the knuckles on one member being designed to coöperate with those on the adjacent members, pintles connecting said knuckles, and a plurality of members pivotally connected with said U-shaped members.

4. A hinge comprising two receiving members, each composed of a semi-circular plate folded transversely to form side members spaced apart, tongues on the ends of said plates bent to form interlocking hooks, and a plurality of hingedly connected members having means pivotally engaged with said receiving members.

In testimony whereof I have hereunto set my hand in presence of two subscribing witnesses.

GIUSEPPE POLVERINO.

Witnesses:
ALBERT S. DEL GAUDIO,
LOUIS RAGUSA.

Copies of this patent may be obtained for five cents each, by addressing the "Commissioner of Patents, Washington, D. C."